United States Patent
Ban et al.

(10) Patent No.: US 10,033,063 B2
(45) Date of Patent: Jul. 24, 2018

(54) METHOD OF MANUFACTURING ELECTRODE ASSEMBLY

(71) Applicant: LG CHEM, LTD., Seoul (KR)

(72) Inventors: Jin Ho Ban, Daejeon (KR); Ji Won Park, Daejeon (KR); Myung Hoon Ko, Daejeon (KR); Seung Ho Na, Daejeon (KR); Young Joo Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 225 days.

(21) Appl. No.: 14/901,662

(22) PCT Filed: Sep. 15, 2014

(86) PCT No.: PCT/KR2014/008572
§ 371 (c)(1),
(2) Date: Dec. 28, 2015

(87) PCT Pub. No.: WO2015/046793
PCT Pub. Date: Apr. 2, 2015

(65) Prior Publication Data
US 2016/0149254 A1 May 26, 2016

(30) Foreign Application Priority Data
Sep. 26, 2013 (KR) .................. 10-2013-0114246

(51) Int. Cl.
*H01M 10/04* (2006.01)
*H01M 10/0585* (2010.01)

(52) U.S. Cl.
CPC ... *H01M 10/0413* (2013.01); *H01M 10/0404* (2013.01); *H01M 10/0436* (2013.01); *H01M 10/0585* (2013.01); *H01M 2220/20* (2013.01)

(58) Field of Classification Search
CPC .................. H01M 10/04; H01M 10/0413
See application file for complete search history.

(56) References Cited

U.S. PATENT DOCUMENTS

| 5,720,781 A | 2/1998 | Kal |
| 7,883,553 B2 | 2/2011 | Mitchell et al. |

(Continued)

FOREIGN PATENT DOCUMENTS

| CN | 101836323 A | 9/2010 |
| CN | 102884665 A | 1/2013 |

(Continued)

OTHER PUBLICATIONS

International Search Report issued in PCT/KR2014/008572, dated Jan. 26, 2015.

(Continued)

*Primary Examiner* — Karie O'Neill Apicella
(74) *Attorney, Agent, or Firm* — Birch, Stewart, Kolasch & Birch, LLP

(57) ABSTRACT

Provided is a method of manufacturing an electrode assembly by using a magazine. The method includes manufacturing radical units in which electrodes and separators are alternately stacked (operation S10), loading and aligning the radical units in an aligning magazine for accommodating the radical units (operation S20), inspecting a dimension of the radical units aligned in operation S20 (operation S30), and transferring radical units considered to have a normal dimension in operation S30, to a stacking magazine to align and stack the radical units, thereby forming an electrode assembly (operation S40).

26 Claims, 10 Drawing Sheets

(56) References Cited

U.S. PATENT DOCUMENTS

| | | | |
|---|---|---|---|
| 7,935,155 B2 | 5/2011 | Mitchell et al. | |
| 2002/0160257 A1 | 10/2002 | Lee et al. | |
| 2002/0160258 A1 | 10/2002 | Lee et al. | |
| 2003/0013012 A1 | 1/2003 | Ahn et al. | |
| 2003/0140482 A1 | 7/2003 | Murata et al. | |
| 2004/0202928 A1 | 10/2004 | Miyamoto et al. | |
| 2004/0220048 A1 | 11/2004 | Leban | |
| 2006/0172882 A1 | 8/2006 | Leban | |
| 2009/0197183 A1 | 8/2009 | Kato | |
| 2010/0255371 A1* | 10/2010 | Takayama | H01M 2/1673 429/210 |
| 2012/0148913 A1 | 6/2012 | Chiba | |
| 2012/0225345 A1 | 9/2012 | Kim | |
| 2014/0020235 A1* | 1/2014 | Aramaki | H01M 2/1673 29/593 |
| 2014/0026399 A1 | 1/2014 | Yuhara et al. | |
| 2014/0134472 A1 | 5/2014 | Kim | |

FOREIGN PATENT DOCUMENTS

| | | |
|---|---|---|
| EP | 2 696 431 A1 | 2/2014 |
| JP | 4-123768 A | 4/1992 |
| JP | 2005-50583 A | 2/2005 |
| JP | 2012-174388 A | 9/2012 |
| JP | 2012-221708 A | 11/2012 |
| JP | 2013-524460 A | 6/2013 |
| KR | 2001-0082058 A | 8/2001 |
| KR | 2001-0082059 A | 8/2001 |
| KR | 2001-0082060 A | 8/2001 |
| KR | 10-2010-0075533 A | 7/2010 |
| KR | 10-2010-0121366 A | 11/2010 |
| KR | 10-2011-0112241 A | 10/2011 |
| KR | 10-2013-0071935 A | 7/2013 |
| TW | 541742 | 7/2003 |
| TW | 200423464 | 11/2004 |
| TW | I229957 | 3/2005 |
| TW | I233709 | 6/2005 |
| TW | 201027828 A1 | 7/2010 |
| TW | 201308728 A1 | 2/2013 |
| WO | WO 2012/020480 A1 | 2/2012 |
| WO | WO 2015/019751 A1 | 2/2015 |

OTHER PUBLICATIONS

Written Opinion of the International Searching Authority issued in PCT/KR2014/008572, dated Jan. 26, 2015.
Extended European Search Report, dated Jul. 1, 2016, for European Application No. 14849320.8.

* cited by examiner

METHOD OF MANUFACTURING ELECTRODE ASSEMBLY

TECHNICAL FIELD

The present invention relates to a method of manufacturing an electrode assembly which is different from a stack folding method and a stack method, and more particularly, to a method of manufacturing an electrode assembly by using a magazine.

BACKGROUND ART

Secondary batteries are regarded with much interest as a power source of electric vehicles (EVs), hybrid electric vehicles (HEVs), and parallel hybrid electric vehicles (PHEVs), which are expected to reduce air pollution caused by typical gasoline and diesel vehicles using fossil fuels. Medium-to-large devices, such as vehicles, require high power and high capacity, and thus, employ a medium-to-large battery module that is formed by electrically connecting a large number of battery cells.

To optimally reduce the size and weight of medium-to-large battery modules, prismatic-type batteries and pouch-type batteries, which have high integration and a small weight-to-capacity ratio, are widely used as battery cells in medium-to-large battery modules.

An electrode assembly is accommodated in a case of a battery cell. Electrode assemblies may be classified according to types of structures including cathodes, separators, and anodes.

For example, electrode assemblies may be classified into jelly-roll (winding type) electrode assemblies having a structure formed by winding long sheet type cathodes and anodes with a separator therebetween, stacked type electrode assemblies formed by sequentially stacking a plurality of cathodes and anodes cut to a predetermined size with a separator therebetween, and stack and folding type electrode assemblies.

Stack and folding type electrode assemblies disclosed in Korean Patent Publication Nos. 2001-0082058, 2001-0082059, and 2001-0082060, applied by the applicant of the present invention, will now be described.

Referring to FIG. 1, an electrode assembly 1 having a stack and folding type structure includes: a plurality of full cells 1a, 1b, 2, 3, and 4, as unit cells, which are formed by sequentially stacking a cathode, a separator, and an anode and overlap one another; and a separator sheet 5 disposed between overlap parts of the full cells 1a, 1b, 2, 3, and 4. The separator sheet 5 has a unit length to surround a full cell and is bent inward by the unit length between the overlap parts to surround each full cell in a range from the full cell 1b disposed in the center of the electrode assembly 1 to the full cell 4 disposed on an outermost side of the electrode assembly 1. A distal end of the separator sheet 5 is finished by using heat welding or attaching an adhesive tape 6 thereto. Such stack and folding type electrode assemblies are manufactured, for example, by arraying the full cells 1a, 1b, 2, 3, and 4 on the separator sheet 5 having a long length and sequentially winding the full cells 1a, 1b, 2, 3, and 4 from an end of the separator sheet 5. However, under this structure, a temperature gradient is formed between the full cells 1a, 1b, and 2, disposed in the central region of the electrode assembly 1, and the full cells 3 and 4 disposed in outermost regions of the electrode assembly 1, and thus, heat dissipation efficiency varies therebetween, which decreases the service life of the electrode assembly 1 when being used for a long time.

A process of forming such electrode assemblies employs two lamination apparatuses for forming each of the electrode assemblies, and a separate folding apparatus. Thus, there is a limit in reducing a tact time of the process. Specifically, when a stacked structure is formed through folding, it is difficult to accurately align upper and lower electrode assemblies of the stacked structure, which makes it difficult to form an assembly having a reliable quality.

That is, a structure of electrode assemblies, to which such a folding process is applied, requires a separate folding apparatus. In addition, when a bi-cell structure is used, two types of bi-cells (that is, an A type bi-cell and C type bi-cell) are manufactured and stacked, and it is significantly difficult to accurately maintain a distance between bi-cells disposed on a long separator sheet before a folding process. That is, it is difficult to accurately align upper and lower unit cells (full cells or bi-cells) in a folding process. In addition, when a high capacity cell is manufactured, it takes a long time to change types.

Next, stacked type electrode assemblies will now be described. Since stacked type structures are well known in the art, limitations of stacked type electrode assemblies will now be described briefly.

Horizontal and vertical widths of a separator of stacked type electrode assemblies may be greater than those of an electrode. Such a stacked type electrode assembly is manufactured by repeatedly performing a process of placing a separator on a magazine or jig having a width corresponding to the horizontal or vertical width of the separator, and placing an electrode on the separator.

However, in this case, electrodes and separators are stacked one by one, and thus, a working time is increased so as to significantly decrease productivity. While the separators can be horizontally and vertically aligned, there is no magazine or jig for accurately aligning the electrodes placed on the separators. Thus, electrodes of stacked type electrode assemblies may be misaligned.

Furthermore, since face-to-face surfaces of a cathode and an anode with a separator therebetween are misaligned from each other, an electrochemical reaction may not occur on one portion of active materials applied to the face-to-face surfaces, thus decreasing efficiency of a battery cell.

DISCLOSURE OF THE INVENTION

Technical Problem

Accordingly, the present invention aims at providing a method of manufacturing an electrode assembly having a structure that is economically manufactured through a simple process.

The present invention also aims at providing a method of manufacturing an electrode assembly in which electrodes are accurately arrayed to improve efficiency thereof.

The present invention also aims at providing an electrode assembly manufacturing method, which manufactures an accurate electrode assembly having a plurality of layers of radical units, just by performing an alignment process and a dimension inspection process on each of the radical unit, without separately performing an alignment process and a dimension inspection process on the whole of the electrode assembly.

Technical Solution

According to an aspect of the present invention, there is provided an electrode assembly manufacturing method including: manufacturing radical units in which electrodes and separators are alternately stacked (operation S10); loading and aligning the radical units in an aligning magazine for accommodating the radical units (operation S20); inspecting a dimension of the radical units aligned in operation S20 (operation S30); and transferring radical units considered to have a normal dimension in operation S30, to a stacking magazine to align and stack the radical units, thereby forming an electrode assembly (operation S40).

Advantageous Effects

According to the present invention, provided is a method of manufacturing an electrode assembly having a structure that is economically manufactured through a simple process.

Also, provided is a method of manufacturing an electrode assembly in which electrodes are accurately arrayed to improve efficiency thereof.

Furthermore, provided is an electrode assembly manufacturing method, which manufactures an accurate electrode assembly having a plurality of layers of radical units, just by performing an alignment process and a dimension inspection process on each of the radical unit, without separately performing an alignment process and a dimension inspection process on the whole of the electrode assembly.

BRIEF DESCRIPTION OF THE DRAWINGS

The above and other aspects, features and other advantages of the present invention will be more clearly understood from the following detailed description taken in conjunction with the accompanying drawings, in which.

MODE FOR CARRYING OUT THE INVENTION

Figure 1:
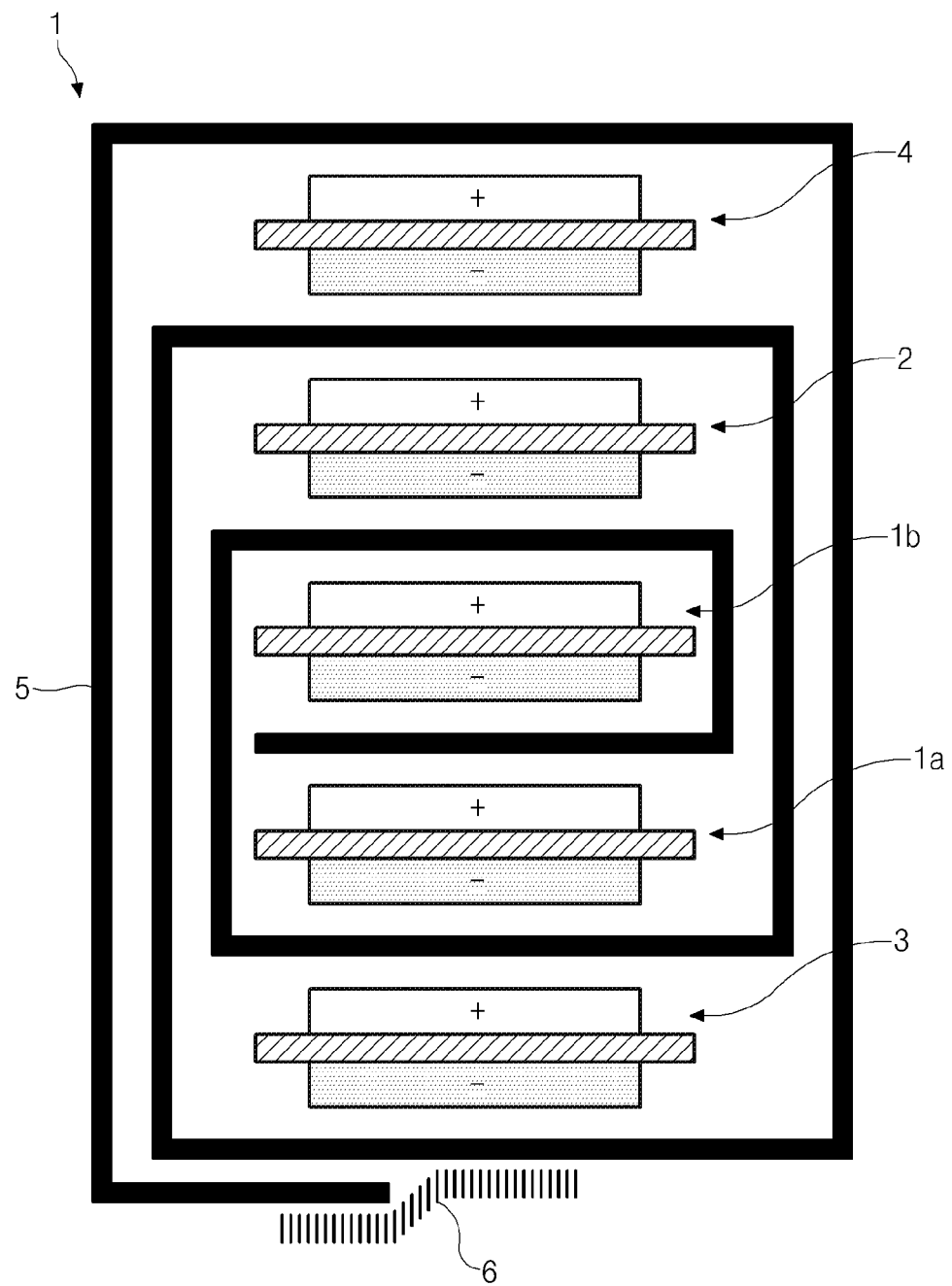
FIG. 1 is a schematic view illustrating a stack and folding type electrode assembly in the related art.

Hereinafter, preferred embodiments of the present invention will be described in detail with reference to the accompanying drawings. However, the present invention is not limited to the following embodiments.

Terms used in the following description and scopes of claims are not limited to terms that have been in dictionaries, and are used only for explaining specific exemplary embodiments while not limiting the present invention.

In the drawings, the size of each element or a specific part that constitutes the element is exaggerated, omitted, or schematically illustrated for convenience in description and clarity. Thus, the size of each element does not entirely reflect an actual size. Moreover, detailed descriptions related to well-known functions or configurations will be ruled out in order not to unnecessarily obscure subject matters of the present invention.

Figure 2:
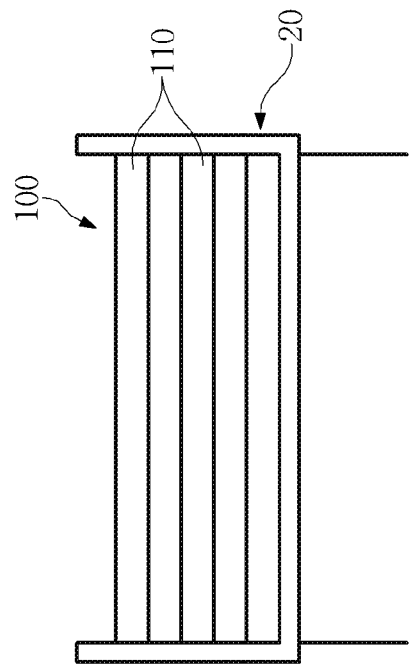
FIG. 2 is a view illustrating an electrode assembly manufacturing device, to which an electrode assembly manufacturing method is applied, according to an embodiment of the present invention.
Figure 2:
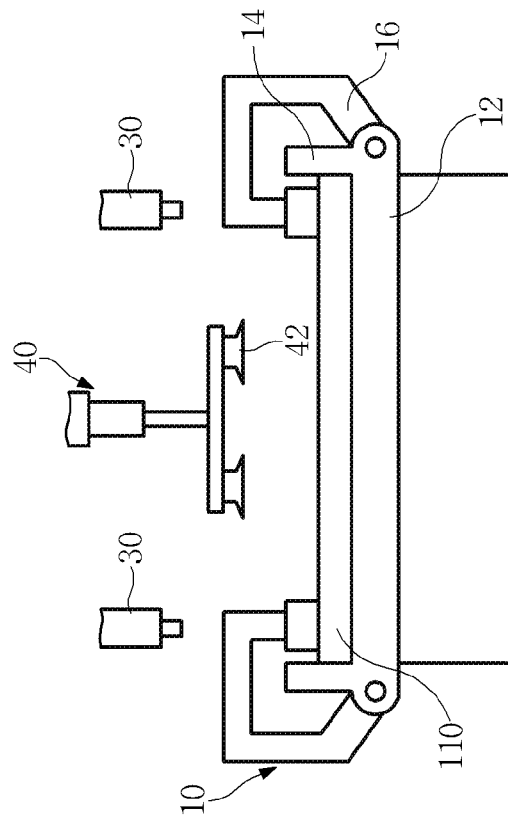

FIG. 2 is a view illustrating an electrode assembly manufacturing device, to which an electrode assembly manufacturing method is applied, according to an embodiment of the present invention. Referring to FIG. 2, the electrode assembly manufacturing device may include: an aligning magazine 10 in which radical units 110 are stacked and aligned; a stacking magazine 20 in which the radical units 110 transferred from the aligning magazine 10 are stacked; a robot arm 40 that holds and transfers the radical units 110 from the aligning magazine 10 to the stacking magazine 20; and a camera 30 for performing a vision inspection on the radical units 110 stacked and aligned in the aligning magazine 10.

The aligning magazine 10 includes: a clamp 16 that presses the radical units 110 placed on a base 12, against the base 12; and a side wall 14 surrounding side surfaces of the radical units 110.

The robot arm 40 includes a holding part 42 for holding the radical units 110 and reciprocates between the aligning magazine 10 and the stacking magazine 20.

An electrode assembly manufacturing device having such a structure is just an example, and any configuration can be used, provided that the configuration performs a function that is the same as or similar to that of the electrode assembly manufacturing device.

Hereinafter, an electrode assembly manufacturing method will be described based on the electrode assembly manufacturing device described briefly with reference to FIG. 2, and another electrode assembly manufacturing device, which has a structure different from that of the above described electrode assembly manufacturing device, can also manufacture an electrode assembly 100 by using the electrode assembly manufacturing method that will now be described.

The electrode assembly manufacturing method according to a preferred embodiment of the present invention includes: manufacturing the radical units 110 (operation S10); stacking and aligning the radical units 110 in the aligning magazine 10 for accommodating the radical units 110 (operation S20); inspecting dimensions of the radical units 110 aligned in operation S20 (operation S30); and transferring radical units 110, considered to have normal dimensions in operation S30, to the stacking magazine 20 to align and stack the radical units 110, thereby forming the electrode assembly 100 (operation S40).

The radical units 110 has a structure in which electrodes and separators are alternately stacked, and operation S10 in which the radical units 110 are manufactured, and a detailed structure of the electrode assembly 100 including the radical units 110 will be described later in detail.

Figure 3:
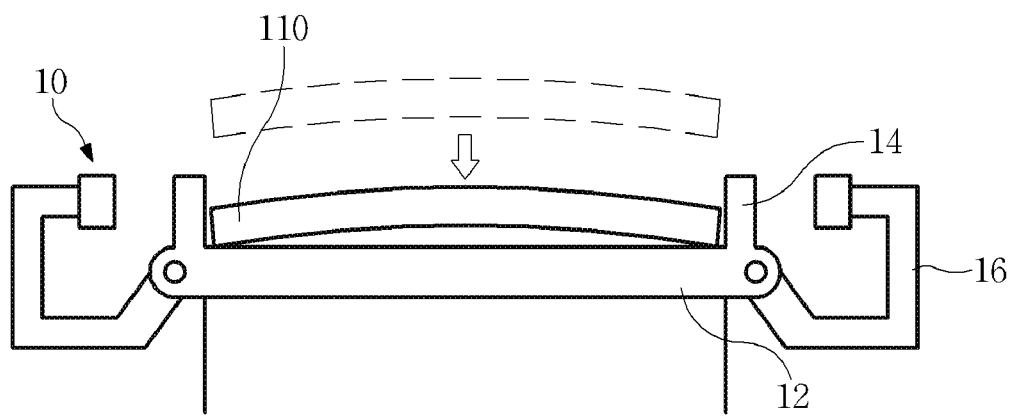
FIG. 3 is a schematic view illustrating a process of stacking radical units in an aligning magazine.
Figure 4:
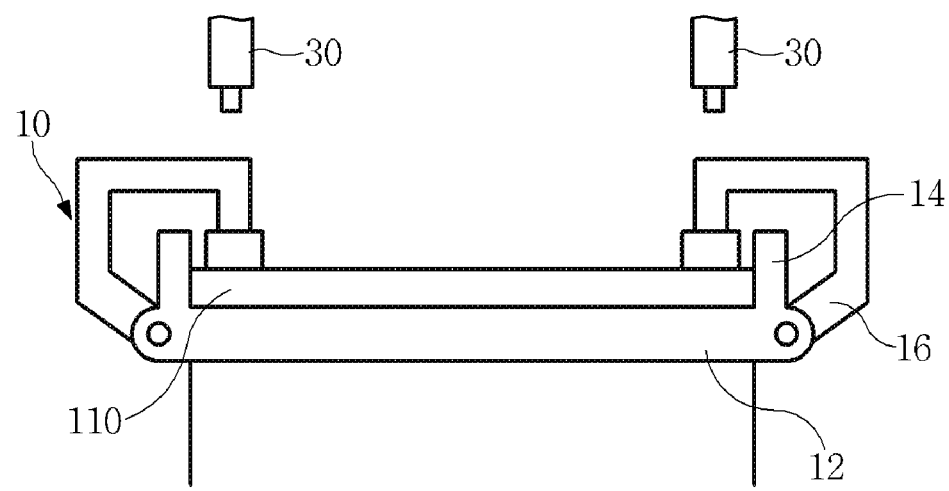
FIG. 4 is a schematic view illustrating a process of aligning a radical unit loaded in an aligning magazine and inspecting dimensions thereof.
Figure 5:
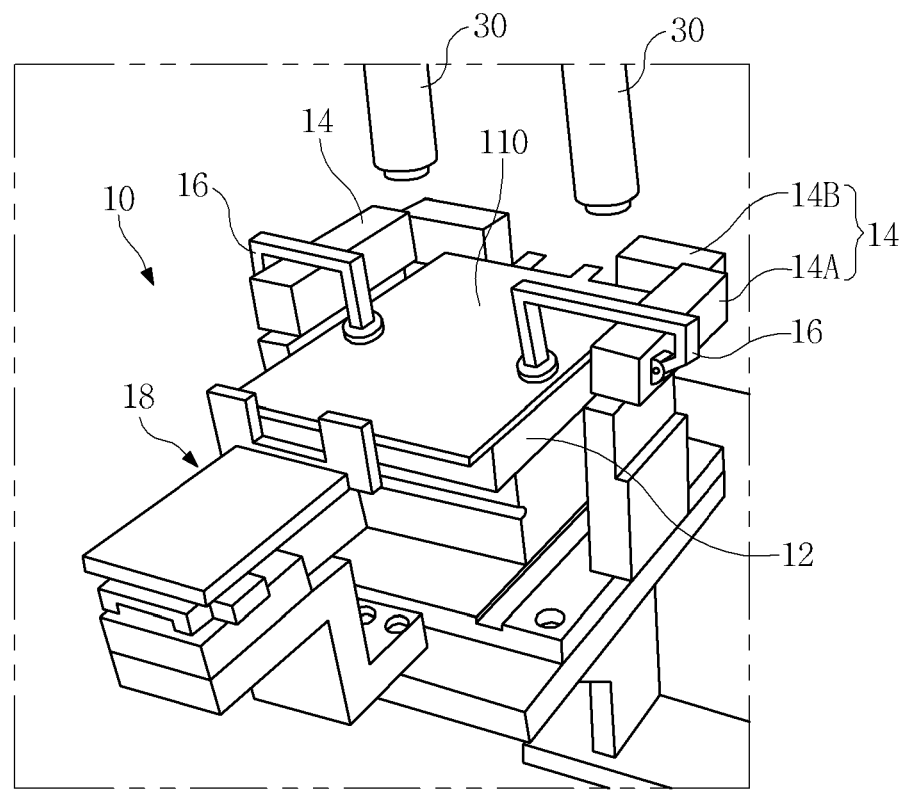
FIG. 5 is a perspective view corresponding to FIG. 4.

Referring to FIGS. 3 to 5, operation S20 is described in which the radical units 110 are stacked on the base 12 of the aligning magazine 10 first. The radical units 110 may be flat, but may not be flat and have a bent shape after a manufacturing process, as illustrated in FIG. 3.

When the radical units 110 have a bent shape, it is difficult to accurately measure a horizontal or vertical width of the radical units 110, thus making it difficult to determine whether the radical units 110 are manufactured to have an accurate dimension. When the radical units 110 are stacked, the radical units 110 may be slightly biased toward a side wall of the aligning magazine 10, which is not an alignment state of the radical units 110.

Hence, the clamp 16 may press and fix the radical units 110 to fix the radical units 110 in a flat state like the base 12 that is flat, thereby completely performing operation S20. That is, when the clamp 16 fixes the radical units 110 in the flat state, a dimension such as the horizontal or vertical width of the radical units 110 can be more accurately measured in operation S30. In addition, even when the radical units 110 are slightly biased toward a side wall of the aligning magazine 10, the radical units 110 are appropriately aligned in the aligning magazine 10 since a side edge of the radical units 110 in the flat state is stopped by the side wall of the aligning magazine 10, and another side edge thereof can be moved toward another side wall of the aligning magazine 10.

Referring to FIG. 5, an aligning actuator 18 is provided on the aligning magazine 10 and pushes horizontal edges of the radical units 110 placed on the base 12, toward a horizontal side wall 14B. Accordingly, when the clamp 16 clamps the radical units 110, vertical edges of the radical units 110 are aligned between vertical side walls 14A, and the horizontal edges of the radical units 110 are aligned in position against the horizontal side wall 14B.

Figure 6:
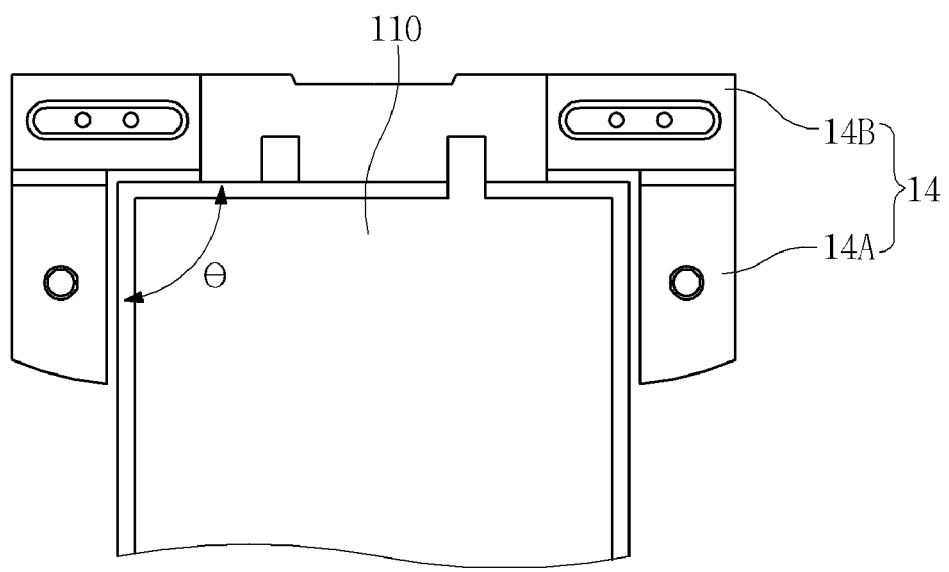
FIG. 6 is a plan view illustrating an electrode tab area of radical units stacked and aligned in an aligning magazine.

Operation S30 in which the dimensions of the radical units 110 are inspected may be performed with the radical units 110 clamped by the clamp 16 as illustrated in FIGS. 4 and 5, and the horizontal and vertical widths of the radical units 110, and an angle θ formed between neighboring sides of the radical units 110 may be measured in operation S30 (refer to FIG. 6).

Figure 7:
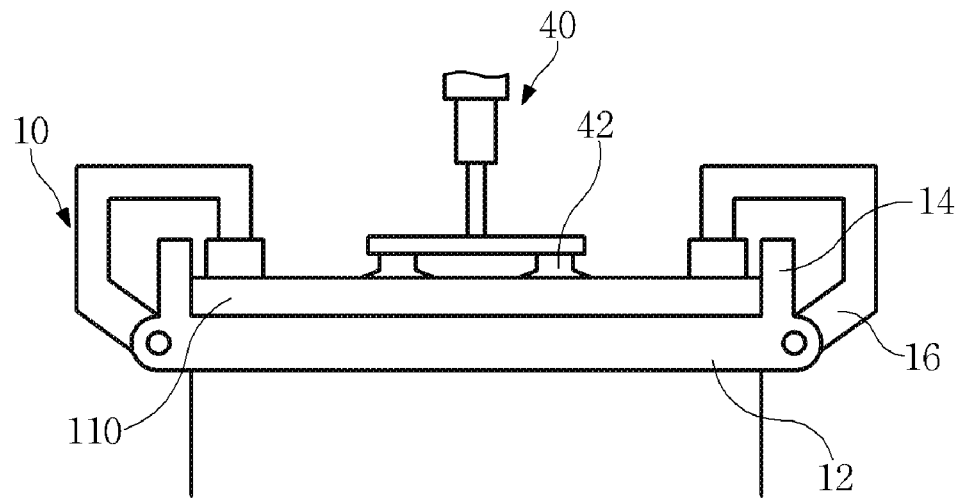
FIG. 7 is a schematic view illustrating a state in which a robot arm holds a radical unit loaded and aligned in an aligning magazine.

The robot arm 40 transfers the radical units 110, considered to have the normal dimensions in operation S30, from the aligning magazine 10 to the stacking magazine 20. When the robot arm 40 holds the radical units 110, the radical units 110 is fixed by the clamp 16 (refer to FIG. 7). After the robot arm 40 holds the radical units 110, the clamp 16 unclamps the radical units 110. The robot arm 40 may use a negative pressure holding method to hold the radical units 110. In this case, a suction structure may be applied to the holding part 42 to apply a negative pressure.

When being unclamped, the radical units 110 may return to the bent shape as illustrated in FIG. 3. However, the robot arm 40 holds the radical units 110 in the flat state, and the radical units 110 are precisely aligned through the flat state of the radical units 110 caused by the clamp 16 in operation S20. Thus, even when the radical units 110 return to the bent shape, the precise alignment of the radical units 110 held by the robot arm 40 is still maintained.

Hence, the robot arm 40 faithfully transfers the radical units 110, precisely aligned in operation S20, to the stacking magazine 20 over a predetermined displacement, just thereby disposing the radical units 110 in a desired location of the stacking magazine 20.

In other words, when the radical units 110 are stacked into a plurality of layers to manufacture the electrode assembly 100, a separate dimension inspection on the radical units 110 is unnecessary in operation S40. In addition, the precise alignment of the radical units 110 is completed in operation S20, and a dimension inspection on the radical units 110 is completed using the camera 30 in operation S30. In addition, while the radical units 110 are moved over a predetermined distance and are stacked in the stacking magazine 20 in operation S40, the precise alignment of the radical units 110 is maintained. Thus, the electrode assembly 100 with the radical units 110 naturally aligned and stacked is formed just by stacking the radical units 110 into the layers in the stacking magazine 20.

Figure 8:
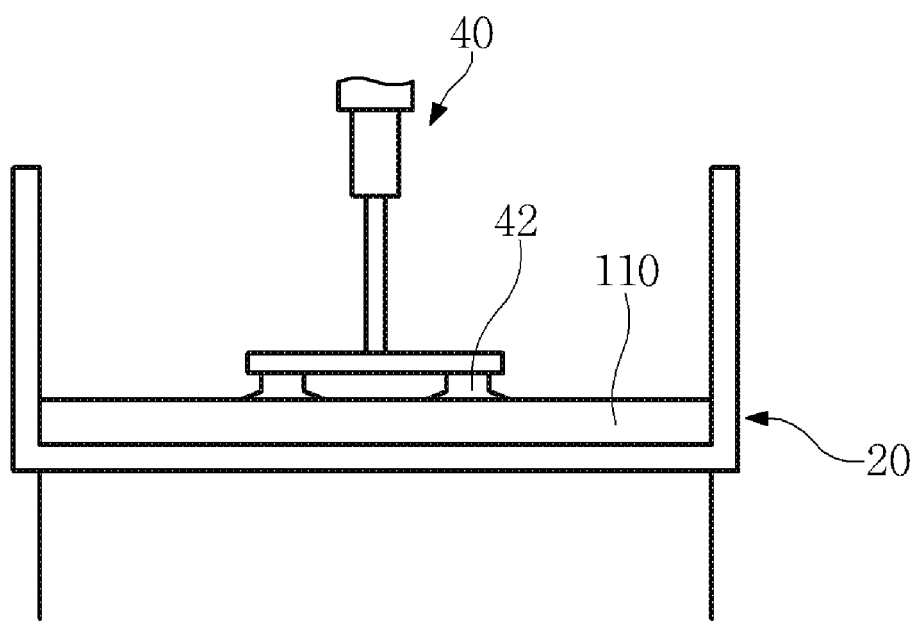
FIG. 8 is a schematic view illustrating a state in which a robot arm transfers a radical unit to a stacking magazine.

The radical units 110 are clamped and unclamped one by one in the aligning magazine 10 by the clamp 16 and are transferred to the stacking magazine 20 by the robot arm 40 (refer to FIG. 8). Thus, the number of the radical units 110 accommodated in the aligning magazine 10 is zero or one at all times, but the number of the radical units 110 accommodated in the stacking magazine 20 gradually increases.

According to the electrode assembly manufacturing method as described above, the radical units 110 are aligned one by one and the dimensions thereof are measured one by one. Thus, the alignment and the measurement of the dimensions are easily performed. In addition, since the electrode assembly 100 including the radical units 110 stacked into the layers can be manufactured just by using alignment and dimension measurement data of only the radical units 110, precise alignment, position adjustment, and complicated dimension measurement of the electrode assembly 100 including the radical units 110 stacked into the layers are unnecessary.

In the foregoing description, the radical units 110 have a structure in which electrodes and separators are just alternately stacked. In addition, operation S10 of manufacturing the radical units 110 is not described in detail yet. Thus, exemplary processes of manufacturing the radical units 110 and structures of various types of electrode assemblies 100 including the radical units 110 will now be described.

The radical unit 110 may be manufactured to have a stacked structure in which a first electrode 111, a first separator 112, a second electrode 113, and a second separator 114 are sequentially stacked.

Figure 9:
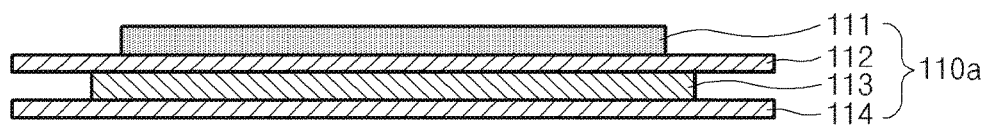
FIG. 9 is a side view illustrating a first structure of a radical unit of an electrode assembly manufactured using an electrode assembly manufacturing method according to the present invention.
Figure 10:
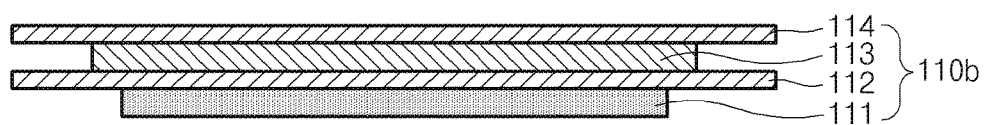
FIG. 10 is a side view illustrating a second structure of a radical unit of an electrode assembly manufactured using an electrode assembly manufacturing method according to the present invention.

An electrode assembly 100 manufactured using an electrode assembly manufacturing method according to the present invention includes one or more radical units 110a and 110b (refer to FIGS. 9 and 10).

The radical unit 110 is formed by sequentially stacking the first electrode 111, the first separator 112, the second electrode 113, and the second separator 114. As such, the radical unit 110 basically has a four-layer structure. In more particular, referring to FIG. 9, the radical unit 110a may be formed by sequentially stacking the first electrode 111, the first separator 112, the second electrode 113, and the second separator 114 from the upper side of the radical unit 110a to the lower side thereof. Alternatively, referring to FIG. 10, the radical unit 110b may be formed by sequentially stacking the first electrode 111, the first separator 112, the second electrode 113, and the second separator 114 from the lower side of the radical unit 110b to the upper side thereof. The pole of the first electrode 111 is opposite to the pole of the second electrode 113. For example, when the first electrode 111 is a cathode, the second electrode 113 may be an anode, and vice versa.

The first electrode 111 of the radical unit 110 includes a collector and an active material layer (an active material) that is applied to both surfaces of the collector. In a same manner, the second electrode 113 of the radical unit 110 includes a collector and an active material layer (an active material) that is applied to both surfaces of the collector.

Figure 11:
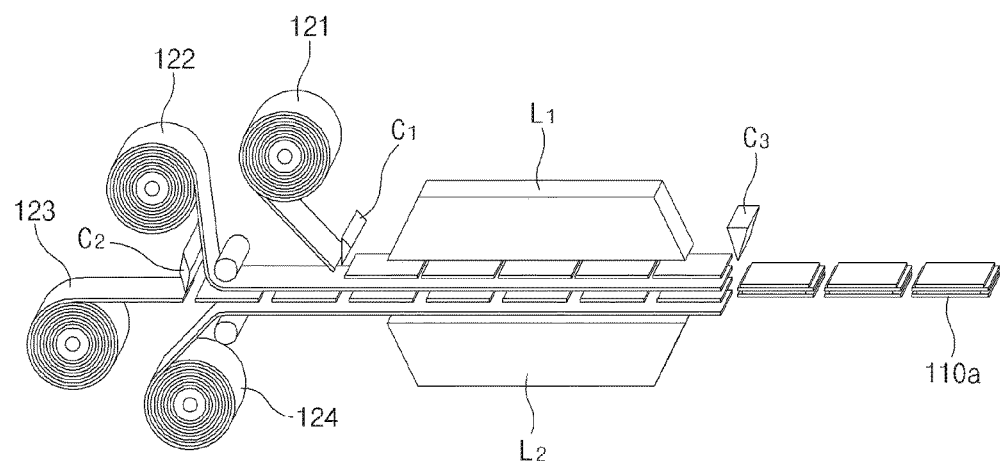
FIG. 11 is a view illustrating a process of manufacturing radical units according to the present invention.

A process of manufacturing the radical unit 110 may be a continuous process below (refer to FIG. 11). First, a first electrode raw material 121, a first separator raw material 122, a second electrode raw material 123, and a second separator raw material 124 are prepared. The first and second electrode raw materials 121 and 123 are cut to predetermined sizes to form the first and second electrodes 111 and 113, which will be described later. Such a manner is applied to the first and second separator raw materials 122 and 124. The first and second electrode raw materials 121 and 123 and the first and second separator raw materials 122 and 124 may be wound around rolls for process automation. After the first and second electrode raw materials 121 and 123 and the first and second separator raw materials 122 and 124 are prepared, the first electrode raw material 121 is cut to the predetermined size using a cutter C1. The second electrode raw material 123 is also cut to the predetermined size using a cutter C2. After that, the first electrode raw material 121 having the predetermined size is supplied onto the first separator raw material 122. The second electrode raw material 123 having the predetermined size is supplied onto the second separator raw material 124. After that, the first and second electrode raw materials 121 and 123 and the first and second separator raw materials 122 and 124 are supplied together to laminators L1 and L2.

The electrode assembly 100 is formed by repeatedly stacking the radical unit 110, as described above. However, if the first electrode 111, the first separator 112, the second electrode 113, and the second separator 114, which constitute the radical unit 110, are separated from one another, it is significantly difficult to repeatedly stack the radical unit 110. Thus, the first electrode 111, the first separator 112, the second electrode 113, and the second separator 114, which constitute the radical unit 110, may be adhered to one another. To this end, the laminators L1 and L2 are used. That is, the laminators L1 and L2 press electrode raw materials and separator raw materials, or heat and press the electrode raw materials and the separator raw materials to adhere the electrode raw materials and the separator raw materials to one another. As such, electrode raw materials and separator raw materials are adhered to one another through a laminating process by the laminators L1 and L2. Such an adhering process makes the radical unit 110 more stably maintain the shape thereof.

After laminating the first and second electrode raw materials 121 and 123 and the first and second separator raw materials 122 and 124, the first separator raw material 122 and the second separator raw material 124 are cut to a predetermined size using a cutter C3. Accordingly, the radical unit 110 may be formed. Additionally, various inspections may be optionally performed on the radical unit 110. For example, a thickness inspection, a vision inspection, and a short circuit inspection may be additionally performed.

The process of manufacturing the radical unit 110 may be the continuous process as described above, and may not be the continuous process. That is, the first and second electrodes 111 and 113 and the first and second separators 112 and 114 may be cut to appropriate sizes and be then stacked to form the radical unit 110.

Surfaces of the first and second separators 112 and 114 or the first and second separator raw materials 122 and 124 may be coated with a coating material having adhesive force. The coating material may be a mixture of inorganic particles and a binder polymer. The inorganic particles may improve thermal stability of a separator. That is, the inorganic particles may prevent the separator from contracting at a high temperature. The binder polymer may immobilize the inorganic particles, and thus, a predetermined porous structure may be formed between the inorganic particles immobilized within the binder polymer. Although the separator is coated with the inorganic particles, ions may efficiently move from a cathode to an anode through the porous structure. The binder polymer stably fixes the inorganic particles to the separator to improve mechanical stability of the separator. In addition, the binder polymer may more efficiently adhere the separator to an electrode. For reference, the separator may be formed of a polyolefin-based separator base material.

Referring to FIGS. 9 and 10, the first and second electrodes 111 and 113 are disposed on both surfaces of the first separator 112, and the second electrode 113 is disposed on a surface of the second separator 114. Thus, both the surfaces of the first separator 112 may be coated with a coating material, and only the surface of the second separator 114 may be coated with the coating material. That is, both the surfaces of the first separator 112, which face the first and second electrodes 111 and 113, may be coated with a coating material, and only the surface of the second separator 114, which faces the second electrode 113, may be coated with the coating material.

As such, an adhering process using a coating material may be performed on only the inside of the racial unit 110. Thus, only one surface of the second separator 114 may be coated as described above. However, both surfaces of the second separator 114 may also be optionally coated since the radical units 110 may be adhered to each other using a method such as heat press. That is, the surface of the second separator 114 facing the second electrode 113, and the opposite surface of the second separator 114 thereto may be coated with a coating material. In this case, a radical unit 110 disposed at the upper side of the second separator 114 may be adhered to another radical unit 110 disposed directly under the first radical unit 110 by the coating material formed on both the surfaces of the second separator 114.

For reference, when a coating material having adhesive force is applied to a separator, it may be undesirable that a predetermined element directly presses the separator. The separator may be extended outward to be longer than electrodes. Thus, a distal end of the first separator 112 may be coupled to a distal end of the second separator 114. For example, a distal end of the first separator 112 may be welded to a distal end of the second separator 114 through ultrasonic welding. Such ultrasonic welding requires direct pressing an object with a horn. However, as such, when a horn directly presses a distal end of a separator, the horn may be adhered to the separator by a coating material having adhesive force, which may cause device trouble. Thus, when a coating material having adhesive force is applied to a separator, a process of directly pressing the separator with a predetermined element may be undesirable.

Additionally, the radical unit 110 may not have the four-layer structure. For example, the radical unit 110 may have an eight-layer structure formed by sequentially stacking the first electrode 111, the first separator 112, the second electrode 113, the second separator 114, the first electrode 111, the first separator 112, the second electrode 113, and the second separator 114. That is, the radical unit 110 may have a structure formed by repeatedly stacking the four-layer structure. The electrode assembly 100 is formed by repeatedly stacking the radical unit 110, as described above. Thus, the electrode assembly 100 may be formed by repeatedly stacking the four-layer structure or, for example, the eight-layer structure.

The electrode assembly 100 may further include at least one of a first auxiliary unit 130 and a second auxiliary unit 140. First, the first auxiliary unit 130 will now be described. The radical unit 110 is formed by sequentially stacking the first electrode 111, the first separator 112, the second electrode 113, and the second separator 114 from the upper side of the radical unit 110 to the lower side, or from the lower side of the radical unit 110 to the upper side. Thus, when the electrode assembly 100 is formed by repeatedly stacking the radical unit 110, the first electrode 111 (116, which is referred to as "a first distal end electrode" hereinafter) is disposed on the uppermost (refer to FIG. 9) or lowermost side (refer to FIG. 10) of the electrode assembly 100 (the first distal end electrode may be a cathode or an anode). The first auxiliary unit 130 is additionally disposed as a layer on the first distal end electrode 116.

Figure 12:
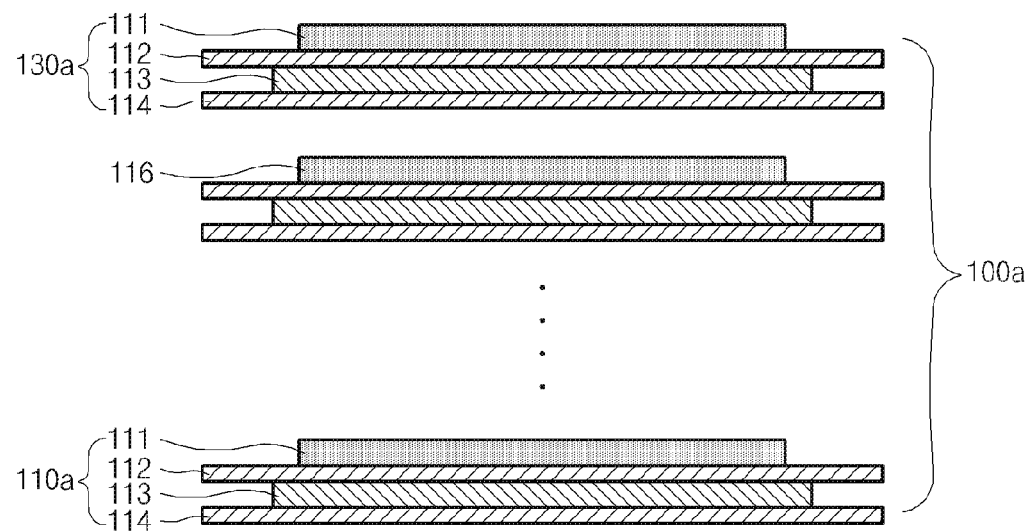
FIG. 12 is a side view illustrating a first structure of an electrode assembly including radical units and a first auxiliary unit.
Figure 13:
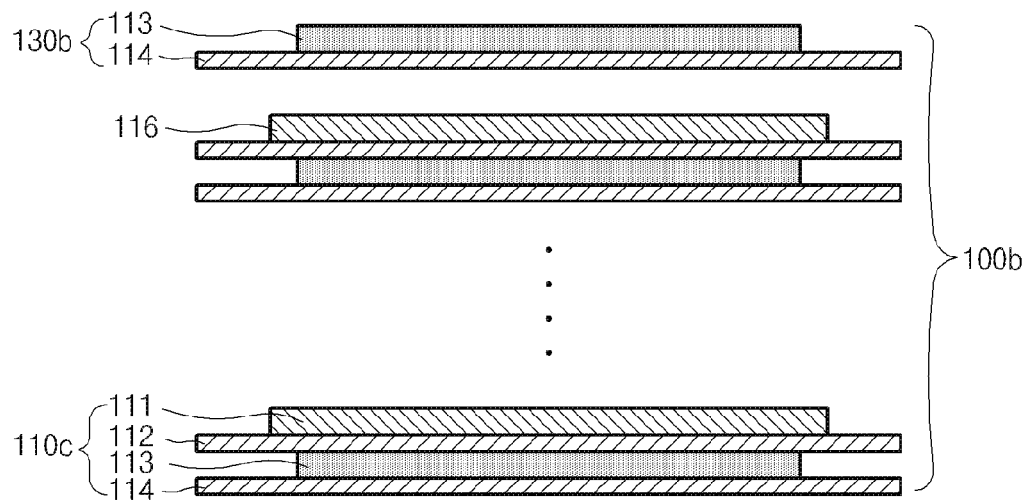
FIG. 13 is a side view illustrating a second structure of an electrode assembly including radical units and a first auxiliary unit.

In more particular, referring to FIG. 12, when a first electrode 111 is a cathode and a second electrode 113 is an anode, a first auxiliary unit 130a may be formed by sequentially stacking a separator 114, an anode 113, a separator 112, and a cathode 111 from a first distal end electrode 116, that is, outwardly from the first distal end electrode 116 (to the upper side of FIG. 12). In addition, referring to FIG. 13, when a first electrode 111 is an anode and a second electrode 113 is a cathode, a first auxiliary unit 130b may be formed by sequentially stacking a separator 114 and a cathode 113 from a first distal end electrode 116, that is, outwardly from the first distal end electrode 116. Referring to FIG. 12 or 13, a cathode may be disposed on an outermost side of the electrode assembly 100 adjacent to the first distal end electrode 116, by using the first auxiliary unit 130.

An electrode may include a collector and an active material layer (an active material) that is applied to both surfaces of the collector. Accordingly, referring to FIG. 12, an active material layer of a cathode disposed under a collector reacts with an active material layer of an anode disposed above a collector, through a separator. When radical units 110 are formed in the same manner and are then sequentially stacked to form an electrode assembly 100, both surfaces of a collector of a first distal end electrode disposed on the uppermost or lowermost side of the electrode assembly 100 are provided with active material layers, like first electrodes 111. However, in this case, the active material layer of the first distal end electrode disposed at an outside of the electrode assembly 100 does not react with another active material layer, which causes a waste of active material layers.

Such an issue is addressed using the first auxiliary unit 130. That is, the first auxiliary unit 130 is formed separately from the radical units 110. Thus, the first auxiliary unit 130 may include a cathode having a collector, only a surface of which is coated with an active material. That is, a cathode of the first auxiliary unit 130 may include a collector, and only one surface of the collector facing the radical units 110 (only a surface facing the lower side of FIG. 12) may be coated with an active material layer. As a result, when a first auxiliary unit 130 is disposed on a first distal end electrode 116 to form an electrode assembly 100, a cathode, only one surface of which is coated, may be disposed on an outermost side of the first distal end electrode 116, thus preventing a waste of active material layers. In addition, since the cathode is a configuration for discharging, for example, nickel ions, when the cathode is disposed on the outermost side of the first distal end electrode 116, battery capacity is improved.

Next, the second auxiliary unit 140 will now be described. The second auxiliary unit 140 basically performs the same function as that of the first auxiliary unit 130. In more particular, a radical unit 110 is formed by sequentially stacking a first electrode 111, a first separator 112, a second electrode 113, and a second separator 114 from the upper side of the radical unit 110 to the lower side, or from the lower side of the radical unit 110 to the upper side. Thus, when an electrode assembly 100 is formed by repeatedly stacking the radical unit 110, the second separator 114 (117, which is referred to as "a second distal end separator" hereinafter) is disposed on the uppermost (refer to FIG. 10) or lowermost side (refer to FIG. 9) of the electrode assembly 100. The second auxiliary unit 140 is additionally disposed as a layer on the second distal end separator 117.

Figure 14:
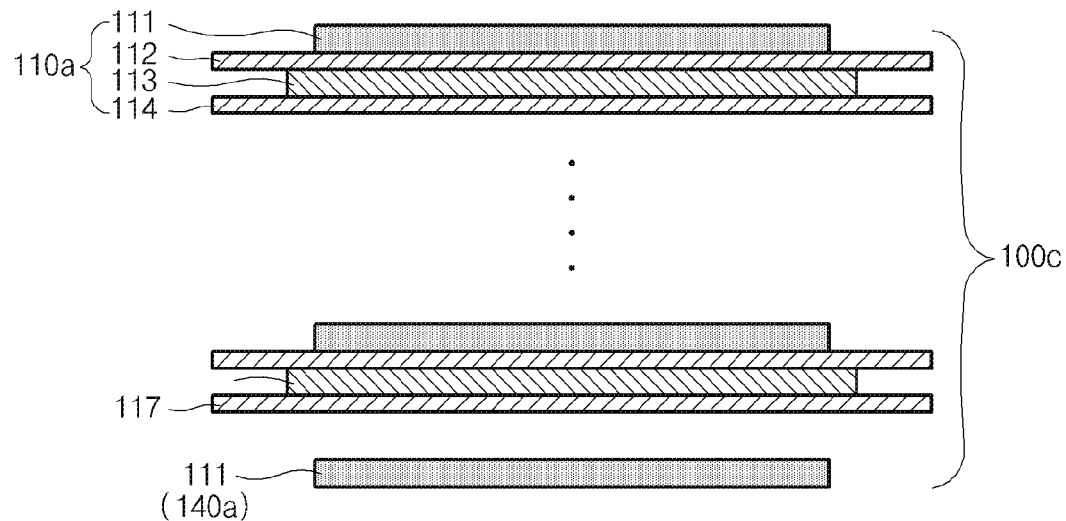
FIG. 14 is a side view illustrating a third structure of an electrode assembly including radical units and a second auxiliary unit.
Figure 15:
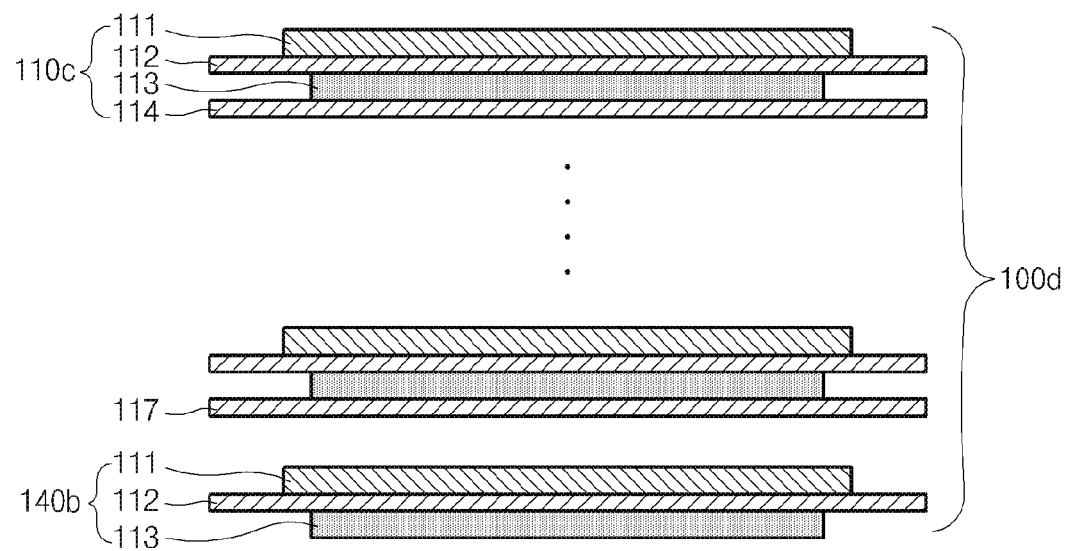
FIG. 15 is a side view illustrating a fourth structure of an electrode assembly including radical units and a second auxiliary unit.

In more particular, referring to FIG. 14, when a first electrode 111 is a cathode, and a second electrode 113 is an anode, a second auxiliary unit 140a may be formed as a cathode 111. In addition, referring to FIG. 15, when a first electrode 111 is an anode and a second electrode 113 is a cathode, a second auxiliary unit 140b may be formed by sequentially stacking an anode 111, a separator 112, and a cathode 113 from a second distal end separator 117, that is, outwardly from the second distal end separator 117 (to the lower side of FIG. 15). Like the first auxiliary unit 130, a cathode of the second auxiliary unit 140 may include a collector, and only one surface of the collector facing the radical units 110 (only a surface facing the upper side of FIG. 15) may be coated with an active material layer. As a result, when a second auxiliary unit 140 is disposed on a second distal end separator 117 to form an electrode assembly 100, a cathode, only one surface of which is coated, may be disposed on an outermost side of the second distal end separator 117.

For reference, referring to FIGS. 12 to 15, a first electrode 111, a first separator 112, a second electrode 113, and a second separator 114 are sequentially stacked from the upper side to the lower side thereof. On the contrary, a first electrode 111, a first separator 112, a second electrode 113, and a second separator 114 may be sequentially stacked from the lower side to the upper side thereof, and the foregoing description can be applied to this case. The first auxiliary unit 130 and the second auxiliary unit 140 may further include a separator on an outermost side thereof, if necessary. For example, when a cathode disposed on the outermost side of the first auxiliary unit 130 and the second auxiliary unit 140 is needed to be electrically insulated from a case, the first auxiliary unit 130 and the second auxiliary unit 140 may further include a separator on an outermost side of the cathode. For a same reason, referring to FIG. 14, a separator may be further provided on a cathode exposed on a side of an electrode assembly 100 opposite to a second auxiliary unit 140 (that is, on the uppermost side of the electrode assembly 100 as illustrated in FIG. 14).

Figure 16:
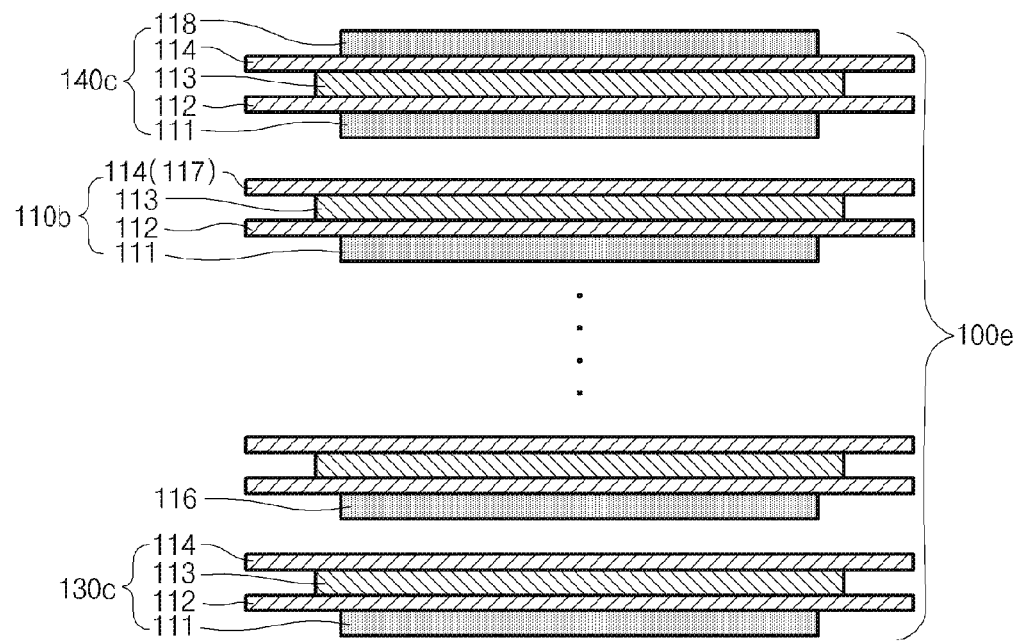
FIG. 16 is a side view illustrating a fifth structure of an electrode assembly including radical units and first and second auxiliary units.
Figure 17:
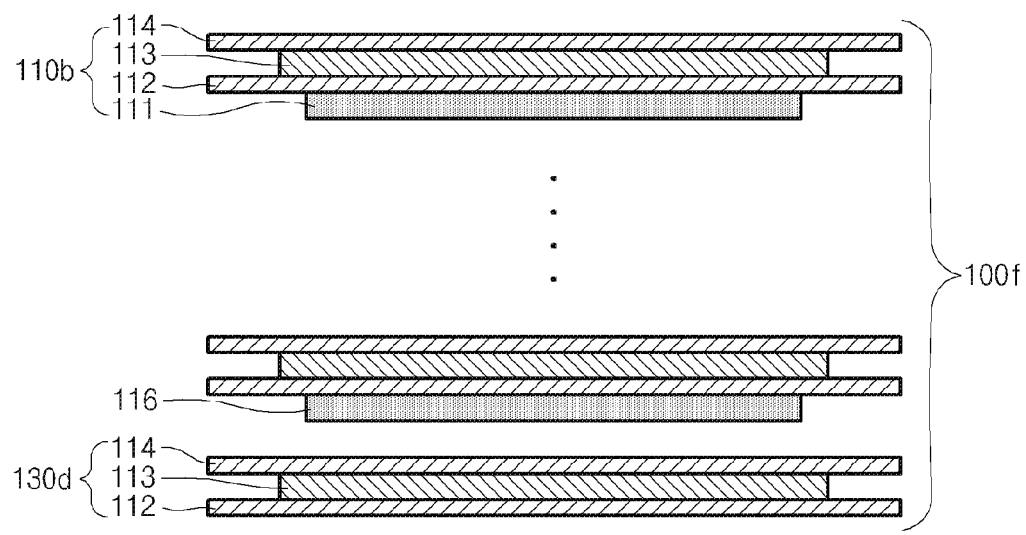
FIG. 17 is a side view illustrating a sixth structure of an electrode assembly including radical units and a first auxiliary unit.
Figure 18:
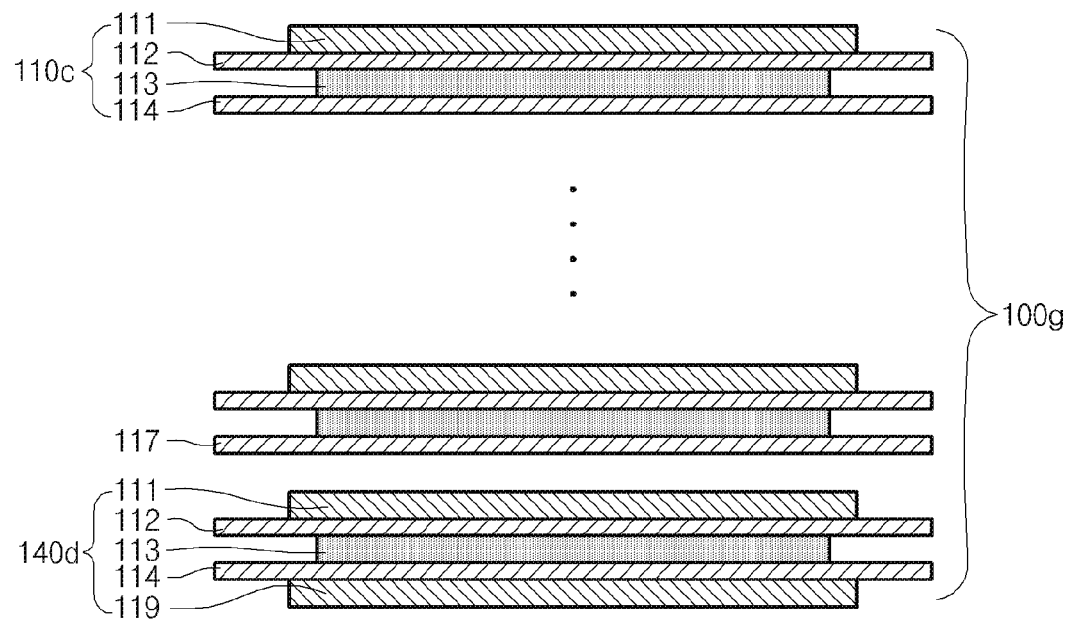
FIG. 18 is a side view illustrating a seventh structure of an electrode assembly including radical units and a second auxiliary unit.

Referring to FIGS. 16 to 18, an electrode assembly 100 may be formed. First, referring to FIG. 16, an electrode assembly 100e may be formed. A radical unit 110b may be formed by sequentially stacking a first electrode 111, a first separator 112, a second electrode 113, and a second separator 114 from the lower side of the radical unit 110b to the upper side thereof. The first electrode 111 may be a cathode, and the second electrode 113 may be an anode. A first auxiliary unit 130c may be formed by sequentially stacking a separator 114, an anode 113, a separator 112, and a cathode 111 from a first distal end electrode 116, that is, from the upper side of FIG. 16 to the lower side thereof. An active material layer may be formed on only a surface of the cathode 111 of the first auxiliary unit 130c facing the radical unit 110b.

A second auxiliary unit 140c may be formed by sequentially stacking a cathode 111 (a first cathode), a separator 112, an anode 113, a separator 114, and a cathode 118 (a second cathode) from a second distal end separator 117, that is, from the lower side of FIG. 16 to the upper side thereof. The cathode 118 (the second cathode) of the second auxiliary unit 140c, which is disposed an outermost side thereof, may include an active material layer on only a surface facing the radical unit 110b. For reference, an auxiliary unit including a separator facilitates alignment of units.

Next, referring to FIG. 17, an electrode assembly 100f may be formed. A radical unit 110b may be formed by sequentially stacking a first electrode 111, a first separator 112, a second electrode 113, and a second separator 114 from the lower side of the radical unit 110b to the upper side thereof. The first electrode 111 may be a cathode, and the second electrode 113 may be an anode. A first auxiliary unit 130d may be formed by sequentially stacking a separator 114, an anode 113, and a separator 112 from a first distal end electrode 116. In this case, a second auxiliary unit may not be provided. For reference, an anode may react with an aluminum layer of a pouch exterior part 200 due to a potential difference therebetween. Thus, the anode may be insulated from the pouch exterior part 200 by a separator.

Finally, referring to FIG. 18, an electrode assembly 100g may be formed. A radical unit 110c may be formed by sequentially stacking a first electrode 110, a first separator 112, a second electrode 113, and a second separator 114 from the upper side of the radical unit 110c to the lower side thereof. The first electrode 111 may be an anode, and the second electrode 113 may be a cathode. A second auxiliary unit 140d may be formed by sequentially stacking an anode 111, a separator 112, a cathode 113, a separator 114, and an anode 119 from a second distal end separator 117. In this case, a first auxiliary unit may not be provided.

The radical units 110 are stacked into a plurality of layers in operation S40 of the electrode assembly manufacturing method according to the preferred embodiment of the present invention. However, this configuration is set forth for convenience in description, and does not mean that the electrode assembly 100 is constituted by only the radical units 110. That is, in operation S40, auxiliary units 130 and 140 may be stacked on the upper or lower surface of one or more layers of radical units 110 or on the upper and lower surfaces thereof, and the auxiliary units 130 and 140 and the radical units 110 may be aligned.

While the present invention has been particularly shown and described with reference to exemplary embodiments and drawings thereof, it will be understood by those of ordinary skill in the art that various modifications and changes in form and details may be made therein without departing from the spirit and scope of the present invention as defined by the following claims.

INDUSTRIAL APPLICABILITY

An electrode assembly manufacturing method according to the present invention economically manufactures an electrode assembly through a simple process.

The invention claimed is:

1. An electrode assembly manufacturing method comprising the following steps:
   a) manufacturing preformed radical units in which electrodes and separators are alternately stacked and adhered to each other;
   b) loading and aligning the preformed radical units in an aligning magazine for accommodating the radical units;
   c) inspecting a dimension of the preformed radical units loaded and aligned in said aligning magazine; and
   d) transferring the preformed radical units considered to have a normal dimension in step c to a stacking magazine to align and stack the preformed radical units, thereby forming an electrode assembly.

2. The method of claim 1, wherein step d is performed without a separate dimension inspection on the radical units.

3. The method of claim 1, wherein, in step d, the preformed radical unit is transferred from the aligning magazine to the stacking magazine by a robot arm after step c.

4. The method of claim 3, wherein the preformed radical units are precisely aligned in step b, and the robot arm transfers the preformed radical units precisely aligned in step b to the stacking magazine over a predetermined displacement.

5. The method of claim 3, wherein step b is performed by a clamp that fixes the preformed radical units in a flat state to the aligning magazine.

6. The method of claim 5, wherein the robot arm holds the preformed radical units when the preformed radical units are fixed by the clamp.

7. The method of claim 6, wherein after the robot arm holds the preformed radical units, the clamp unclamps the preformed radical units.

8. The method of claim 6, wherein the robot arm uses a negative pressure holding method to hold the preformed radical units.

9. The method of claim 5, wherein the preformed radical units are clamped and unclamped one by one in the aligning magazine by the clamp and are transferred to the stacking magazine by the robot arm.

10. The method of claim 1, wherein step c comprises measuring a width of the preformed radical units and an angle between neighboring sides thereof.

11. The method of claim 1, wherein the preformed radical unit comprises a stacked structure formed by sequentially stacking a first electrode, a first separator, a second electrode, and a second separator.

12. The method of claim 11, wherein the preformed radical unit has a structure in which the stacked structure is repeated a plurality of times.

13. The method of claim 11, wherein the preformed radical unit is formed by adhering the first electrode, the first separator, the second electrode, and the second separator to one another.

14. The method of claim 13, wherein the first electrode, the first separator, the second electrode, and the second separator are adhered to one another by pressing, or pressing and heating the first electrode, the first separator, the second electrode, and the second separator.

15. The method of claim 13, wherein the preformed radical unit is formed by laminating the first electrode, the first separator, the second electrode, and the second separator.

16. The method of claim 13, wherein a surface of the first and second separators is coated with a coating material having adhesive force.

17. The method of claim 16, wherein the coating material comprises a mixture of inorganic particles and a binder polymer.

18. The method of claim 16, wherein both surfaces of the first separator facing the first electrode and the second electrode are coated with the coating material, and only a surface of the second separator facing the second electrode is coated with the coating material.

19. The method of claim 16, wherein both surfaces of the first separator facing the first electrode and the second electrode are coated with the coating material, and a surface of the second separator facing the second electrode, and a surface thereof opposite to the first surface are coated with the coating material, and
the preformed radical units of the electrode assembly are adhered to each other by the coating material of the second separator.

20. The method of claim 11, wherein the electrode assembly further comprises a first auxiliary unit disposed as a layer on a first distal end electrode as the first electrode disposed on the uppermost or lowermost side of the electrode assembly, and
when the first electrode is a cathode, and the second electrode is an anode, the first auxiliary unit is formed by sequentially stacking a separator, an anode, a separator, and a cathode from the first distal end electrode, and
when the first electrode is an anode, and the second electrode is a cathode, the first auxiliary unit is formed by sequentially stacking a separator and a cathode from the first distal end electrode.

21. The method of claim 20, wherein the cathode of the first auxiliary unit comprises:
a collector; and
a cathode active material applied to only one of both surfaces of the collector, the one surface facing the preformed radical units.

22. The method of claim 11, wherein the electrode assembly further comprises a first auxiliary unit disposed as a layer on a first distal end electrode as the first electrode disposed on the uppermost or lowermost side of the electrode assembly, and
when the first electrode is a cathode, and the second electrode is an anode, the first auxiliary unit is formed by sequentially stacking a separator, an anode, and a separator from the first distal end electrode.

23. The method of claim 11, wherein the electrode assembly further comprises a second auxiliary unit disposed as a layer on a second distal end separator as the second separator disposed on the uppermost or lowermost side of the electrode assembly, and
when the first electrode is a cathode, and the second electrode is an anode, the second auxiliary unit is formed as a cathode, and
when the first electrode is an anode, and the second electrode is a cathode, the second auxiliary unit is formed by sequentially stacking an anode, a separator, and a cathode from the second distal end separator.

24. The method of claim 23, wherein the cathode of the second auxiliary unit comprises:
a collector; and
a cathode active material applied to only one of both surfaces of the collector, the one surface facing the preformed radical units.

25. The method of claim 11, wherein the electrode assembly further comprises a second auxiliary unit disposed as a layer on a second distal end separator as the second separator disposed on the uppermost or lowermost side of the electrode assembly, and
when the first electrode is a cathode, and the second electrode is an anode, the second auxiliary unit is formed by sequentially stacking a first cathode, a separator, an anode, a separator, and a second cathode from the second distal end separator, and
the second cathode of the second auxiliary unit comprises a collector and a cathode active material applied to only one of both surfaces of the collector, the one surface facing the preformed radical units.

26. The method of claim 11, wherein the electrode assembly further comprises a second auxiliary unit disposed as a layer on a second distal end separator as the second separator disposed on the uppermost or lowermost side of the electrode assembly, and
when the first electrode is an anode, and the second electrode is a cathode, the second auxiliary unit is formed by sequentially stacking an anode, a separator, a cathode, a separator, and an anode from the second distal end separator.

* * * * *